(12) United States Patent
Chen et al.

(10) Patent No.: US 7,085,056 B2
(45) Date of Patent: Aug. 1, 2006

(54) LIGHT GUIDE PLATE WITH DIFFRACTION GRATINGS AND BACKLIGHT MODULE USING THE SAME

(75) Inventors: Ga-Lane Chen, Fremont, CA (US); Charles Leu, Fremont, CA (US); Tai-Cherng Yu, Tu-Cheng (TW)

(73) Assignee: Hon Hai Precision Industry Co., Ltd., Tu-cheng (TW)

( * ) Notice: Subject to any disclaimer, the term of this patent is extended or adjusted under 35 U.S.C. 154(b) by 159 days.

(21) Appl. No.: 10/951,207

(22) Filed: Sep. 27, 2004

(65) Prior Publication Data

US 2005/0052732 A1 Mar. 10, 2005

(30) Foreign Application Priority Data

Sep. 10, 2003 (TW) ............................... 92128084 A

(51) Int. Cl.
*G02B 5/18* (2006.01)
*G02B 27/44* (2006.01)

(52) U.S. Cl. .................. 359/566; 362/617; 349/65
(58) Field of Classification Search ............... 359/566, 359/569; 362/617, 618, 619, 558; 349/62, 349/63, 64, 65
See application file for complete search history.

(56) References Cited

U.S. PATENT DOCUMENTS

| 5,703,667 | A | * | 12/1997 | Ochiai ........................ 349/65 |
| 6,250,767 | B1 |   | 6/2001  | Kusafuka et al. |
| 6,612,720 | B1 |   | 9/2003  | Beadle |
| 6,879,355 | B1 | * | 4/2005  | Kim ........................... 349/65 |

* cited by examiner

*Primary Examiner*—Alessandro Amari
(74) *Attorney, Agent, or Firm*—Tim Tingkang Xia, Esq.; Morris, Manning & Martin

(57) ABSTRACT

A light guide plate (20) has a light incidence surface (221) for receiving light, a light emitting surface (223) for emitting light, and a bottom surface (222). The light emitting surface has a plurality of diffraction grating units. Each diffraction grating unit has a strong diffractive portion and a weak diffractive portion. In each diffraction grating unit, grating directions of the strong and weak diffractive portions are orthogonal to each other. Area ratios of the strong diffractive portions in the diffraction grating units progressively increase with increasing distance away from the light incidence surface. The grating directions of the strong diffractive portions may vary according to the locations of the diffraction grating units relative to a light source. These features improve the overall efficiency of utilization of light, and enable the light emitting surface to output highly uniform light.

20 Claims, 2 Drawing Sheets

LIGHT GUIDE PLATE WITH DIFFRACTION GRATINGS AND BACKLIGHT MODULE USING THE SAME

BACKGROUND OF THE INVENTION

1. Field of the Invention

The present invention relates to a light guide plate utilizing diffraction gratings for controlling of light emissions, and a backlight module for a liquid crystal display using such a light guide plate.

2. Description of Prior Art

A typical liquid crystal display requires a backlight module in order to be able to provide uniform illumination. The performance of the backlight module greatly depends on a light guide plate employed therein. Means for enhancing the uniformity of light that is output from a light guide plate can be classified into two categories. The first category uses geometrical optic means, such as prisms or micro dots. The second category uses wave optic means, such as diffraction gratings. Light guide plates with multifarious configurations of micro dots and prisms have been developed, and some of these light guide plates can generate quite uniform light beams. However, the uniformity provided by dots is relatively low compared with light guide plates having gratings. This is because the gratings of the latter kind of light guide plate can be precisely configured to correspond to the wavelength band of visible light beams, thereby accurately controlling the uniformity of transmission of the light beams. Nevertheless, there are two main problems associated with gratings. Firstly, a grating is subject to becoming worn over time. Secondly, a grating generates spectral phenomenon.

Referring to FIG. 5, U.S. Pat. No. 5,703,667, issued on Dec. 30, 1997, discloses a backlight module. The backlight module 1 comprises a light guide plate 2 having a light incidence surface 21, a bottom surface 22 and a light emitting surface 23, a fluorescent tube 4 disposed adjacent the light incidence surface 21, a reflection plate 5 disposed under the bottom surface 22, and a diffusing plate 6 and a prism plate 7 disposed on the light emitting surface 23 in that order from bottom to top.

A plurality of reflective diffraction grating units 3 is provided on the bottom surface 22. All the diffraction grating units 3 are parallel with the fluorescent tube 4. Each diffraction grating unit 3 comprises a grating part parallel with the fluorescent tube 4, and a non-grating part. Because all the grating parts of the diffraction grating units 3 are aligned in parallel as described, the diffraction grating units 3 provide strong diffraction of light beams orthogonally emitting from the fluorescent tube 4.

The ratio of a grating part width to a non-grating part width in the diffraction grating units 3 becomes progressively greater with increasing distance away from the light incidence surface 21. Therefore, light beams that are available in large quantities at places nearer to the light incidence surface 21 undergo weaker diffraction, and light beams that are available only in small quantities at places more remote from the light incidence surface 21 undergo stronger diffraction. As a result, the light emitting surface 23 provides uniform outgoing light beams.

However, in numerous actual applications, the linear fluorescent tube 4 cannot accurately emit light rays in a same direction, or point light sources are used instead of the linear fluorescent tube 4. In such cases, the light beams arriving at the bottom surface 22 do not have a same direction. If the light beams are mainly incident on a diffraction grating unit 3 at an angle that is other than orthogonal, the diffraction effect of the diffraction grating unit 3 is weak. Furthermore, light beams arriving at the non-grating parts of the diffraction grating units 3 are wasted. As a result, the light guide plate 2 has limited uniformity of outgoing light beams and limited efficiency of utilization of light.

It is desired to provide a backlight module having a light guide plate which overcomes the above-described problems.

SUMMARY OF THE INVENTION

An object of the present invention is to provide a light guide plate for a backlight module which yields high uniformity of outgoing light and which has a high light utilization efficiency.

A light guide plate of the present invention comprises a light incidence surface for receiving light, a light emitting surface for emitting light, and a bottom surface. The light emitting surface has a plurality of diffraction grating units. Each diffraction grating unit comprises a strong diffractive portion and a weak diffractive portion. Grating directions of the strong and weak diffractive portions are orthogonal to each other. The grating direction of the strong diffractive portion is substantially perpendicular to a direction of light beams received by the diffraction grating unit.

Because the grating directions of the strong diffractive portions in the diffraction grating units vary according to the varying incoming light beams received by the diffraction grating units, the strong diffractive portions have improved light utilization efficiency. In addition, the weak diffraction portions can diffract incoming light beams that are received in oblique directions, which further improves the overall light utilization efficiency.

Moreover, area ratios of the strong diffractive portions in the diffraction grating units progressively increase with increasing distance away from the light incidence surface. This enables the light emitting surface to output highly uniform light.

Other objects, advantages, and novel features of the present invention will become more apparent from the following detailed description when taken in conjunction with the accompanying drawings, in which:

DETAILED DESCRIPTION OF THE INVENTION

Figure 1:
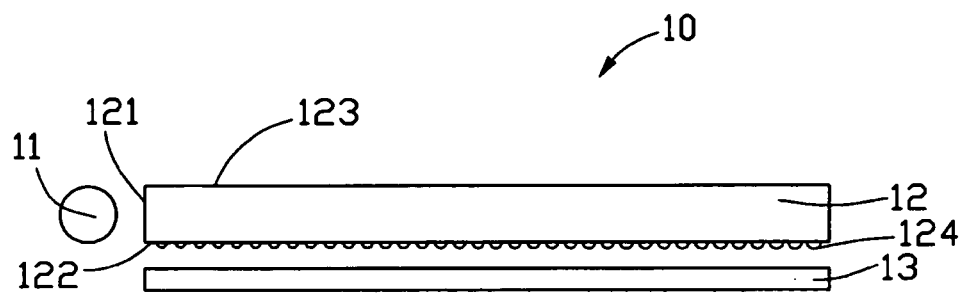
FIG. 1 is a schematic, side sectional view of a first embodiment of a backlight module having a light guide plate according to the present invention.

Referring to FIG. 1, a backlight module 10 according to the first embodiment of the present invention is shown. The backlight module 10 comprises a linear light source 11, a plate-like transparent light guide member 12 having a rectangular cross-section, and a reflection plate 13. The light guide plate 12 comprises a light incidence surface 121, a light emitting surface 123, and a bottom surface 122 opposite to the light emitting surface 123. The light source 11 is a CCFL (cold cathode fluorescent lamp) disposed adjacent the light incidence surface 121. The reflection plate 13 is disposed under the bottom surface 122. A plurality of micro dots 124 is formed on the bottom surface 122 for diffusing light beams.

Figure 2:
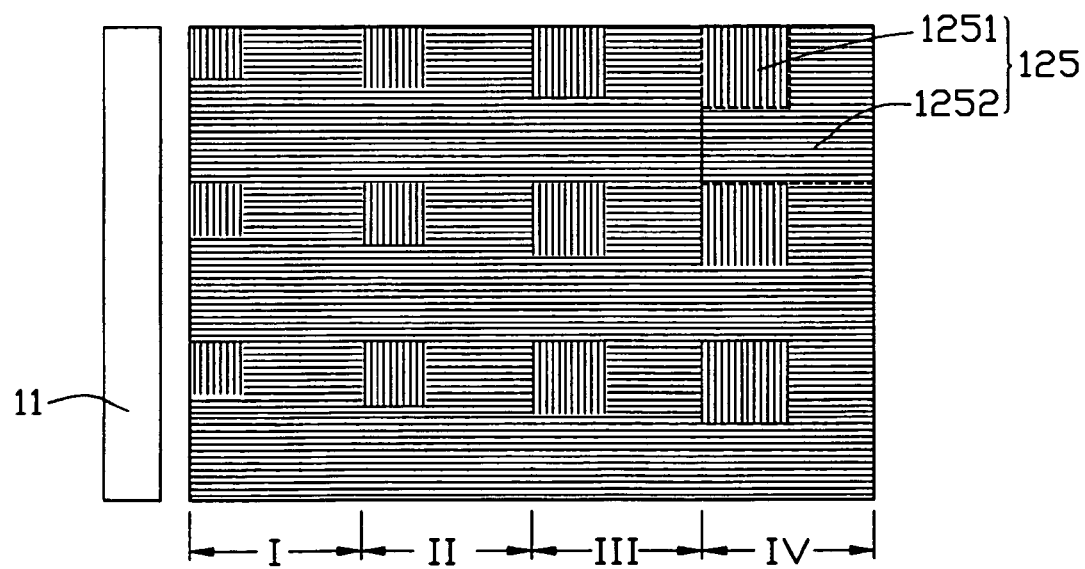
FIG. 2 is a top elevation of the light guide plate of FIG. 1, showing a distribution and structure of a plurality of diffraction grating units on a light emitting surface thereof.

Referring to FIG. 2, a plurality of diffraction grating units 125 is provided continuously on the light emitting surface 123. Each unit 125 has a strong diffractive portion 1251 and a weak diffractive portion 1252. The grating constant in both diffractive portions 1251, 1252 is in the range from 2–10 μm, and preferably 3 μm. Since the CCFL light source 11 mainly emits light beams in a direction perpendicular to the light incidence surface 121, a grating direction of the strong diffractive portion 1251 is arranged to be parallel with the light incidence surface 121 for diffracting the light beams with maximum efficiency. A grating direction of the weak diffractive portion 1252 is perpendicular to that of the strong diffractive portion 1251.

Referring to FIG. 2, a ratio of an area of the strong diffractive portion 1251 to an area of the weak diffractive portion 1252 in each unit 125 becomes progressively greater with increasing distance away from the light incidence surface 121. As shown in FIG. 2, units 125 in four regions I, II, III, IV sequenced along a direction away from the light incidence surface 121 have different configurations and different area ratios. Because the diffraction grating units 125 further from the light incidence surface 121 have larger strong diffractive portions 1251, they have stronger diffracting capability. Since the intensity of light beams decreases with increasing distance of propagation, the quantity of light beams received by the units 125 decreases with increasing distance away from the light incidence surface 121. The configuration of the diffraction grating units 125 on the light emitting surface 123 compensates the location of each unit 125 with a corresponding diffraction capability. This assures uniformity of the light beams emitting from the light emitting surface 123.

Each unit 125 has the weak diffraction portion 1252 in addition to the strong diffraction portion 1251. The weak diffraction portion 1252 can diffract incoming light beams that do not travel in directions perpendicular to the light incidence surface 123. That is, a small quantity of light beams is incident on the unit 125 in oblique directions. The weak diffractive portion 1252 diffracts these light beams to some extent, thereby improving utilization of all light beams.

The uniformity of light emitting from the light guide plate 10 can be controlled by configuring the area ratios of the strong diffractive portions 1251 in the units 125 accordingly. Unlike in the prior art, there is no wastage of light beams at non-grating parts. Therefore the light utilization efficiency of the light guide plate 10 is higher, at least fractionally. In high-end products, the change in intensity of light beams emitted from the units 125 having the weak diffractive portions 1252 needs to be considered and is desirable. This is because of the exacting requirements for uniformity of illumination of such products.

Further, most light sources including the light source 11 irradiate light beams with various wavelengths, and the UV (ultra violet) light component of the light beams often comprises a large share of the total light energy. In the backlight module 10, a fluorescent layer (not shown) is provided on the bottom surface 122 to utilize the UV light energy. When UV light impinges on the fluorescent layer, the fluorescent layer emits visible light. This reduces or even eliminates wastage of the UV energy of the light beams, and enhances the brightness of the light beams emitted from the backlight module 10.

Figure 3:
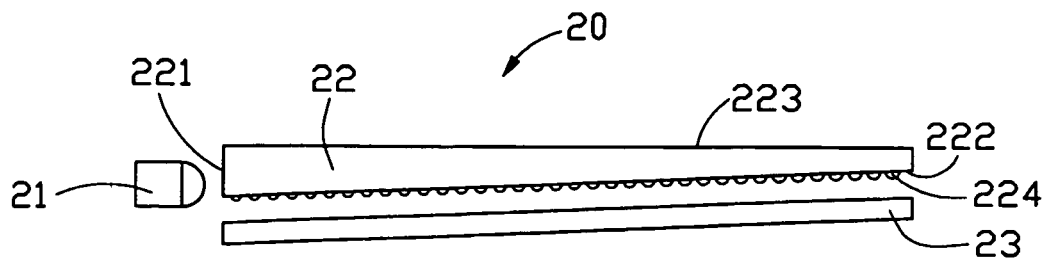
FIG. 3 is a schematic, side sectional view of a second embodiment of a backlight module having a light guide plate according to the present invention.

Referring to FIG. 3, a backlight module 20 according to the second embodiment of the present invention is shown. The backlight module 20 comprises two point light sources 21, a transparent light guide plate 22 having a wedgy cross-section, and a reflection plate 23. The light guide plate 22 comprises a light incidence surface 221, a light emitting surface 223, and a bottom surface 222 opposite to the light emitting surface 223. The light sources 21 are LEDs (light emitting diodes), and are disposed adjacent the light incidence surface 221. The reflection plate 23 is disposed under the bottom surface 222. A plurality of micro dots 224 is formed on the bottom surface 222, for diffusing light beams.

Figure 4:
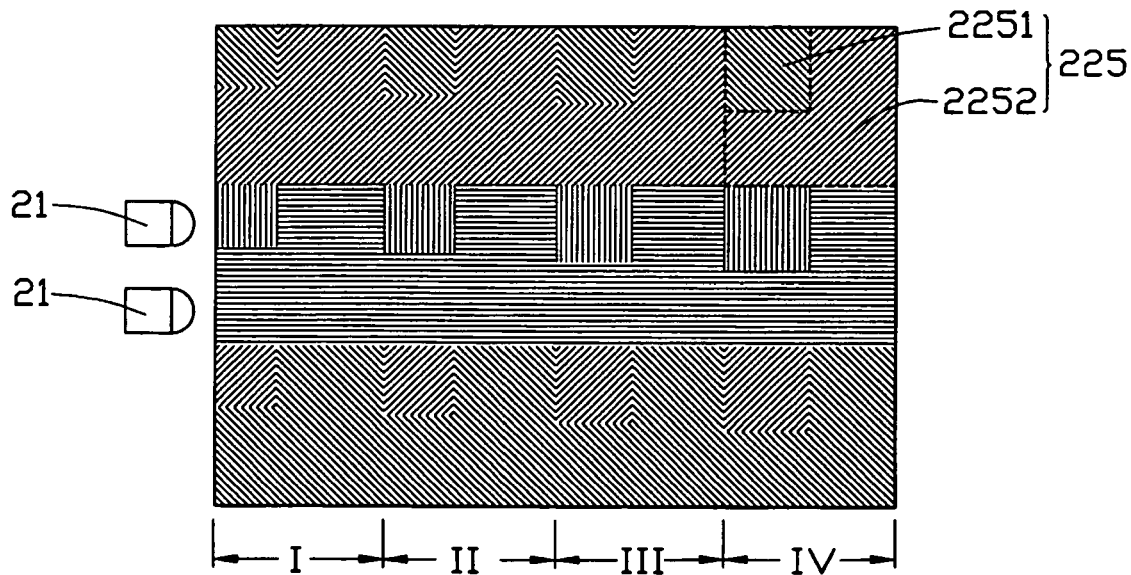
FIG. 4 is a top elevation of the light guide plate of FIG. 3, showing a distribution and structure of a plurality of diffraction grating units on a light emitting surface thereof.
Figure 5:
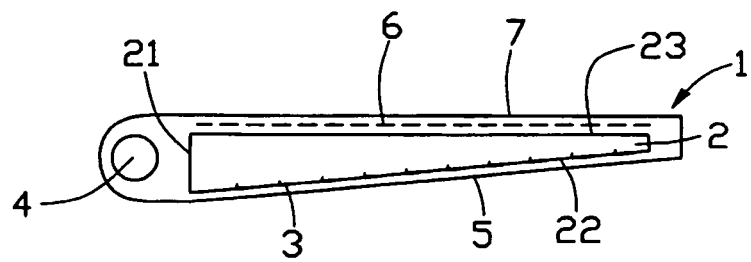
FIG. 5 is a schematic, side sectional view of a conventional backlight module.

Referring to FIG. 4, a plurality of diffraction grating units 225 is provided continuously on the light emitting surface 223. Each unit 225 has a strong diffractive portion 2251 and a weak diffractive portion 2252. The grating constant in both diffraction portions is in the range from 2–10 μm, and preferably 3 μm. Because the light sources 21 are two LEDs, light beams emitted by them are quite different from the light beams emitted by the CCFL 11 of the backlight module 10 of the first embodiment. Propagation of the light beams emitted by the light sources 21 is approximately over a range of angles covering three directions; that is, a 2 o'clock direction, a 3 o'clock direction, and a 4 o'clock direction. The light emitting surface 223 is divided into four regions I, II, III and IV sequenced along a direction away from the light incidence surface 221. Each region has three units 225 disposed along a direction parallel with the incidence surface 221. That is, the units 225 are in an upper, a middle, and a lower position. The units 225 in the four regions I, II, III, IV have progressively larger strong diffractive portions 2251, similar to the diffraction grating units 125 of the backlight module 10. However, the grating directions of the strong diffractive portions 2251 of the units 225 differ. The units 225 at the upper, middle and lower positions have three different grating directions respectively, each being perpendicular to a main direction of incoming light beams. This enables the light guide plate 20 to emit light beams uniformly even though the light sources 21 do not irradiate light beams in a single uniform direction. In each unit 225, the grating direction of the weak diffractive portion 2252 is perpendicular to that of the strong diffractive portion 2251. Thus light beams incident on the weak diffractive portion 2252 in oblique directions are diffracted.

The backlight module 20 has a fluorescent layer (not shown) provided on the bottom surface 222, similar to the backlight module 10. When UV light impinges on the fluorescent layer, the fluorescent layer emits visible light. This enhances the brightness of the light beams emitted from the backlight module 20.

The above-described embodiments employ progressively increasing area ratios of the strong diffractive portions 1251, 2251 in the units 125, 225. Further or alternatively, the grating constants of the units 125, 225 can be varied in order to obtain the desired diffraction capabilities. That is, the grating constants of the strong diffractive portions 1251, 2251 of the diffraction grating units 125, 225 can progressively decrease with increasing distance away from the light incidence surface 121, 221. Whatever embodiment is adopted, the units at various locations have various diffraction capabilities in order to compensate for the differences in intensities of the light beams received at the units.

The micro dots 124, 224 of the bottom surfaces 122, 222 can be replaced by prisms or reflective gratings that similarly diffuse light beams. The fluorescent layer can be made of $SrAl_2O_4$. The units 125, 225 can be formed on the light guide plate 12, 22 by injection molding. For precision, the mold used for such process is itself preferably manufactured by way of laser beam etching or electron beam etching, or another kind of precision process used in the semiconductor field.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A light guide plate, comprising:
a light incidence surface for receiving light, a light emitting surface for emitting light, and a bottom surface, wherein the light emitting surface has a plurality of diffraction grating units, and each diffraction grating unit comprises a strong diffractive portion and a weak diffractive portion, grating directions of the strong and weak diffractive portions are orthogonal to each other, and the grating direction of the strong diffractive portion is substantially perpendicular to a direction of light beams received by the diffraction grating unit.

2. The light guide plate as claimed in claim 1, wherein diffractive capabilities of the diffraction grating units progressively increase with increasing distance away from the light incidence surface.

3. The light guide plate as claimed in claim 2, wherein areas of the strong diffractive portions in the diffraction grating units progressively increase with increasing distance away from the light incidence surface.

4. The light guide plate as claimed in claim 2, wherein grating constants of the strong diffractive portions of the diffraction grating units progressively decrease with increasing distance away from the light incidence surface.

5. The light guide plate as claimed in claim 2, wherein areas of the strong diffractive portions in the diffraction grating units progressively increase with increasing distance away from the light incidence surface, and grating constants of the strong diffractive portions in the diffraction grating units progressively decrease with increasing distance away from the light incidence surface.

6. The light guide plate as claimed in claim 1, wherein a plurality of micro dots is provided on the bottom surface.

7. The light guide plate as claimed in claim 1, wherein a fluorescent layer is provided on the bottom surface.

8. The light guide plate as claimed in claim 1, wherein a plurality of reflective gratings is provided on the bottom surface.

9. A backlight module, comprising:
a light source, and
a light guide plate which comprises a light incidence surface for receiving light, a light emitting surface for emitting light, and a bottom surface, wherein the light emitting surface has a plurality of diffraction grating units, and each diffraction grating unit has a strong diffractive portion and a weak diffractive portion, grating directions of the strong and weak diffractive portions are orthogonal to each other, and the grating directions vary according to the location of the diffraction grating unit relative to the light source.

10. The backlight module as claimed in claim 9, wherein diffractive capabilities of the diffraction grating units progressively increase with increasing distance away from the light incidence surface.

11. The backlight module as claimed in claim 10, wherein areas of the strong diffractive portions in the diffraction grating units progressively increase with increasing distance away from the light incidence surface.

12. The backlight module as claimed in claim 10, wherein grating constants of the strong diffractive portions of the diffraction grating units progressively decrease with increasing distance away from the light incidence surface.

13. The backlight module as claimed in claim 10, wherein areas of the strong diffractive portions in the diffraction grating units progressively increase with increasing distance away from the light incidence surface, and grating constants of the strong diffractive portions of the diffraction grating units progressively decrease with increasing distance away from the light incidence surface.

14. The backlight module as claimed in claim 9, wherein a plurality of micro dots is provided on the bottom surface.

15. The backlight module as claimed in claim 9, wherein a fluorescent layer is provided on the bottom surface.

16. The backlight module as claimed in claim 9, wherein a plurality of reflective grating units is provided on the bottom surface.

17. A backlight module, comprising:
a light source, and
a light guide member having a light incidence surface facing said light source for light from said light source to pass through said incidence surface and move along at least one pathway in said light guide member, a strong diffractive portion interferingly located in said at least one pathway and extending along a first extension direction substantially orthogonal to said at least one pathway, a weak diffractive portion neighboring said strong diffractive portion and interferingly located in said at least one pathway, said weak diffractive portion extending along a second extension direction different from said first extension direction.

18. The backlight module as claimed in claim 17, wherein said strong and weak diffractive portions are parts of a diffraction grating unit, said strong diffractive portion has gratings extending orthogonal to said at least one pathway and said weak diffractive portion has gratings extending parallel to said at least one pathway.

19. The backlight module as claimed in claim 17, wherein at least two of said strong and weak diffractive portions are located on an emitting surface of said light guide member where said light from said light source leaves said light guide member, and one of said at least two strong portions located closer to said light source occupies a larger area of a total occupying area of said strong and weak diffractive portions than another of said at least two strong portion located farther away from said light source.

20. The backlight module as claimed in claim 17, wherein said light from said light source has two of said at least one pathway in said light guide member so as to allow said strong diffractive portion in one of said at least two pathways having an extending direction different from said strong diffractive portion in another of said at least two pathways.

* * * * *